United States Patent
Lombardi et al.

(10) Patent No.: US 11,781,464 B1
(45) Date of Patent: Oct. 10, 2023

(54) DETECTING REDUCTANT QUALITY USING A VIRTUAL SENSOR

(71) Applicant: Caterpillar Inc., Peoria, IL (US)

(72) Inventors: Frank Lombardi, Germantown Hills, IL (US); Baoyong Liu, San Antonio, TX (US); Urvish Joshi, Dunlap, IL (US); Austin Bierle, Peoria, IL (US); Jay Venkataraghavan, Dunlap, IL (US); Kent Anthony Schonert, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/657,576

(22) Filed: Mar. 31, 2022

(51) Int. Cl.
*F01N 11/00* (2006.01)
*F01N 3/20* (2006.01)
*F01N 9/00* (2006.01)

(52) U.S. Cl.
CPC .............. *F01N 11/00* (2013.01); *F01N 3/208* (2013.01); *F01N 9/005* (2013.01); *F01N 9/007* (2013.01); *F01N 11/007* (2013.01); *F01N 2550/02* (2013.01); *F01N 2550/05* (2013.01); *F01N 2900/04* (2013.01); *F01N 2900/0406* (2013.01); *F01N 2900/0408* (2013.01); *F01N 2900/0412* (2013.01); *F01N 2900/06* (2013.01); *F01N 2900/08* (2013.01); *F01N 2900/1402* (2013.01); *F01N 2900/1602* (2013.01); *F01N 2900/1614* (2013.01); *F01N 2900/18* (2013.01); *F01N 2900/1814* (2013.01)

(58) Field of Classification Search
CPC combination set(s) only.
See application file for complete search history.

(56) References Cited

U.S. PATENT DOCUMENTS

| | | |
|---|---|---|
| 8,141,346 B2 | 3/2012 | Shaikh et al. |
| 8,769,935 B2 | 7/2014 | Shaikh et al. |
| 9,050,561 B1 | 6/2015 | Shetney et al. |
| (Continued) | | |

FOREIGN PATENT DOCUMENTS

WO 2015/183239 A1 12/2015

OTHER PUBLICATIONS

European Extended Search Report for Europe Patent Appln. No. 23159530.7, dated May 19, 2023 (8 pgs).

*Primary Examiner* — Binh Q Tran
(74) *Attorney, Agent, or Firm* — Bookoff McAndrews, PLLC (57) ABSTRACT

A method for estimating a quality of reductant in an engine aftertreatment system for an engine using a virtual sensor, the method comprising: determining whether an enablement condition is met, wherein the enablement condition is one or more of: a reductant fill condition determined based on data received from one or more float sensors associated with the engine; a machine start condition determined based on machine speed data obtained from a speed sensor associated with the engine; and/or a rationality check condition determined based on data associated with a fault of one or more sensors associated with the engine; upon determining that the enablement condition is met, receiving NOx measurement data obtained from at least one NOx sensor; generating a reductant quality value based on the NOx measurement data; and outputting a reductant quality determination based on the reductant quality value.

20 Claims, 4 Drawing Sheets

(56) References Cited

U.S. PATENT DOCUMENTS

| | | | |
|---|---|---|---|
| 10,684,196 B2 | 6/2020 | Singh et al. | |
| 10,927,741 B2 | 2/2021 | Wei et al. | |
| 2008/0178575 A1* | 7/2008 | Shaikh | F01N 9/00 60/299 |
| 2010/0005871 A1* | 1/2010 | Kitazawa | F01N 3/206 60/295 |
| 2010/0326052 A1 | 12/2010 | Sun | |
| 2013/0000276 A1* | 1/2013 | Grichnik | F01N 3/2066 60/297 |
| 2013/0145749 A1* | 6/2013 | Merchant | F01N 3/2066 60/295 |
| 2013/0152545 A1 | 6/2013 | Chavannavar | |
| 2015/0096287 A1* | 4/2015 | Qi | F01N 3/208 60/286 |
| 2016/0108786 A1 | 4/2016 | Narayanan | |
| 2016/0114289 A1* | 4/2016 | Tanioka | B01D 53/9495 422/111 |
| 2019/0049341 A1* | 2/2019 | Singh | F01N 11/007 |

\* cited by examiner

DETECTING REDUCTANT QUALITY USING A VIRTUAL SENSOR

TECHNICAL FIELD

The present disclosure relates generally to internal combustion engine systems, and more particularly, to estimating the quality of reductant in an internal combustion engine aftertreatment system using a virtual sensor.

BACKGROUND

Internal combustion engines are useful in various applications, including mobile machines and power generation. Internal combustion engines are commonly used in conjunction with one or more aftertreatment devices that receive exhaust from the engine and reduce an amount of undesired emissions such as nitrogen oxides (NOx). One exemplary aftertreatment device is a Selective Catalytic Reduction (SCR) device or SCR catalyst. SCR catalysts may react with NOx to produce nitrogen and water. However, this reaction also requires the presence of a reductant in the SCR catalyst. A storage system may be provided in communication with an aftertreatment system to supply a reductant-containing fluid, which may be referred to as diesel exhaust fluid (DEF), to the SCR catalyst. This fluid may contain urea that, when heated, produces a reductant (ammonia) that allows the SCR catalyst to react with NOx. The ability to accurately and reliably measure DEF quality in the exhaust is helpful in evaluating the effectiveness and efficiency of the aftertreatment device.

Various devices have been used to measure or detect reductant (e.g., DEF) quality. However, these dedicated physical sensors for detecting reductant quality are prone to failures due to aging, permeation, aeration, damage, ambient conditions inaccuracies (such as icing), and so forth. Failure of these physical sensors can lead to incorrect measurements, customer downtime and warranty issues, and increased undesired emissions. Manufacturing and installing physical DEF quality sensors also results in additional costs and delay in implementation of aftertreatment systems for internal combustion engines. There is thus a need to more reliably and efficiently measure and detect DEF quality using a virtual sensor.

An exemplary method for aftertreatment monitoring is disclosed in U.S. Pat. No. 10,927,741 B2 (the '741 patent) to Wei. The method disclosed in the '741 patent includes determining one or more operating conditions of an internal combustion engine to obtain an expected $NO_x$ emissions downstream of a $NO_x$ reduction catalyst over a period of time. The method further includes obtaining values for $NO_x$ with a $NO_x$ sensor positioned downstream of the $NO_x$ reduction catalyst over the period of time. The method then includes comparing the expected and actual values and determining a fault value for a $NO_x$ conversion capability of a $NO_x$ reduction system in response to the comparing.

While the method described in the '741 patent may be useful in some circumstances, it includes complex start conditions, for example, requiring four separate determinations including determining whether an engine fuel mass flow and an engine charge mass flow have values and rates of change that fall below thresholds, determining whether additional data screening parameters permit monitoring, and determining whether a value ratio of the engine fuel mass flow and the engine charge mass flow is between a high and low threshold. Further, the method of the '741 patent only compares averaged values to generate a fault value for the NOx reduction system.

The disclosed method and system for detecting reductant quality using a virtual sensor may solve one or more of the problems set forth above and/or other problems in the art. The scope of the current disclosure, however, is defined by the attached claims, and not by the ability to solve any specific problem.

SUMMARY

In one aspect, a method for estimating a quality of reductant in an engine aftertreatment system for an engine using a virtual sensor is disclosed. The method may include: determining, by one or more processors, whether an enablement condition is met, wherein the enablement condition is one or more of: a reductant fill condition determined based on data received from one or more float sensors associated with the engine; a machine start condition determined based on machine speed data obtained from a speed sensor associated with the engine; and/or a rationality check condition determined based on data associated with a fault of one or more sensors associated with the engine; upon determining that the enablement condition is met, receiving, at one or more processors, NOx measurement data obtained from at least one NOx sensor; generating, by the one or more processors, a reductant quality value based on the NOx measurement data; and outputting, by the one or more processors, a reductant quality determination based on the reductant quality value.

In another aspect, a system for estimating a quality of reductant in an engine aftertreatment system for an engine using a virtual sensor is disclosed. The system may include: a memory storing instructions; and a processor executing the instructions to perform a process including: determining whether an enablement condition is met, wherein the enablement condition is one or more of: a reductant fill condition determined based on data received from one or more float sensors associated with the engine; a machine start condition determined based on machine speed data obtained from a speed sensor associated with the engine; and/or a rationality check condition determined based on data associated with a fault of one or more sensors associated with the engine; upon determining that the enablement condition is met, receiving NOx measurement data obtained from at least two NOx sensors; generating a reductant quality value based on the NOx measurement data; and outputting a reductant quality determination based on the reductant quality value, wherein the reductant quality determination includes an indication of a pass condition, an indication of a fail condition, or an indication of a defer decision condition.

In yet another aspect, a non-transitory computer-readable medium storing instructions that, when executed by a processor, cause the processor to perform a method for estimating a quality of reductant in an engine aftertreatment system for an engine using a virtual sensor is disclosed. The method may include: determining whether an enablement condition is met, wherein the enablement condition is one or more of: a reductant fill condition determined based on data received from one or more float sensors associated with the engine; a machine start condition determined based on machine speed data obtained from a speed sensor associated with the engine; and/or a rationality check condition determined based on data associated with a fault of one or more sensors associated with the engine; upon determining that the enablement condition is met, receiving NOx measurement data obtained from at least two NOx sensors; generating a reductant quality value based on the NOx measurement data; and outputting a reductant quality determination based on the generated reductant quality value.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
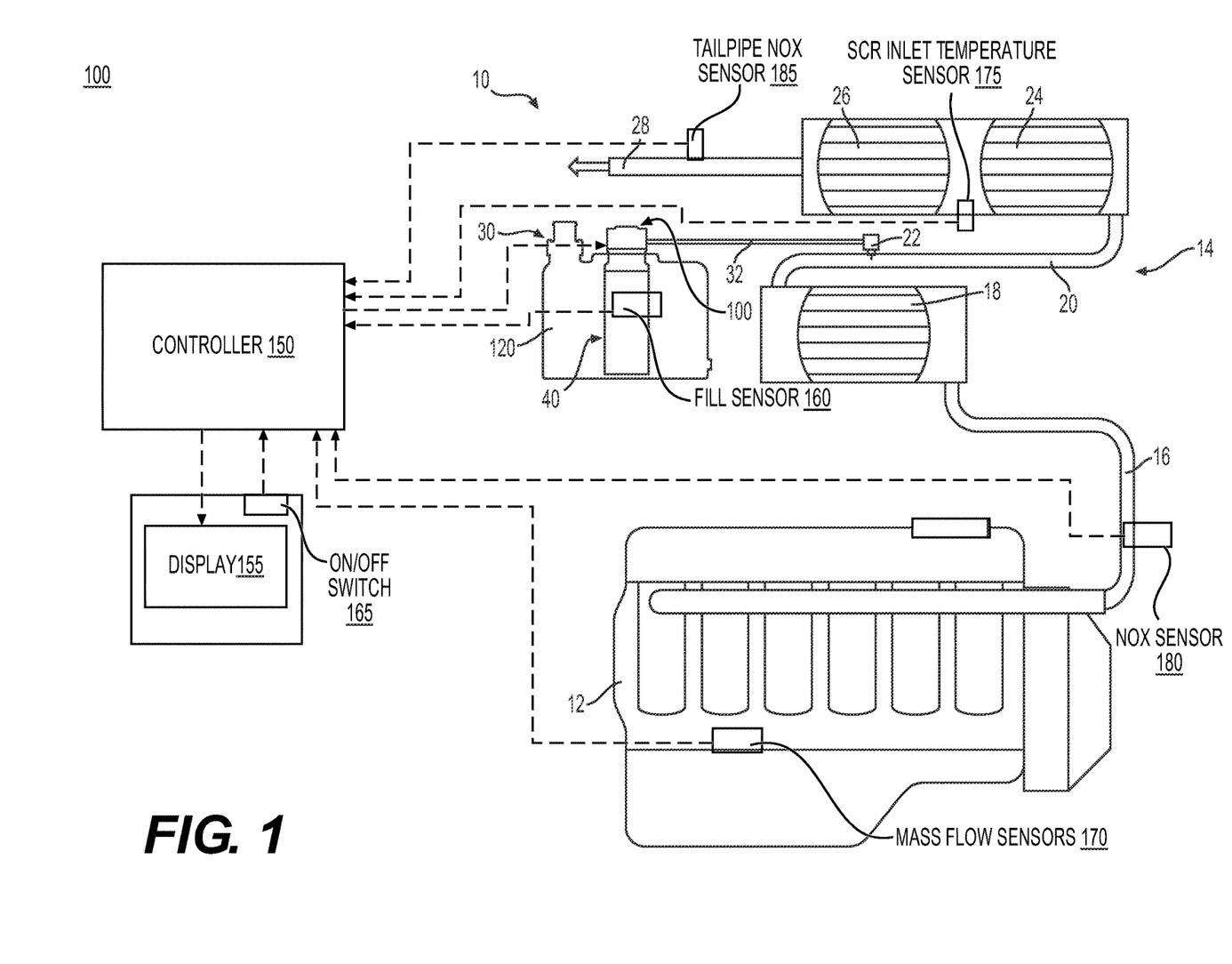
FIG. 1 is a schematic diagram illustrating an internal combustion engine system with a virtual sensor for estimating quality of reductant in an aftertreatment system, according to an aspect of the present disclosure.

FIG. 1 illustrates an internal combustion engine system 10 that may include an engine 12 (e.g., an internal combustion engine), an aftertreatment system 14 (e.g., an exhaust aftertreatment system) that receives and treats exhaust from engine 12, a controller 150, and a display 155. Internal combustion engine system 10 may be used in any capacity, for example, in mobile earthmoving machines or stationary gensets. While engine 12 may be a diesel internal combustion engine, any suitable combustion engine for combusting liquid fuel (e.g., gasoline, diesel, etc.) or gaseous (e.g., natural gas) fuel may employed as engine 12. Aftertreatment system 14 may include one or more aftertreatment devices 18, 24, 26 and a reductant storage system 30 (e.g., a storage system for reductant such as diesel exhaust fluid (DEF)). Exemplary aftertreatment devices 18, 24, 26 include diesel oxidation catalysts, particulate filters, and selective catalytic reduction (SCR) catalysts. First aftertreatment device 18 may be connected downstream of engine 12 via a first exhaust passage 16. Second and third aftertreatment devices 24, 26 may be in fluid communication with, and downstream of, first aftertreatment device 18 via a second exhaust passage 20. A third exhaust passage 28 may extend downstream of second and third aftertreatment devices 24, 26, and may include one or more suitable passages for guiding treated exhaust gas to an exhaust outlet. The first, second, and third aftertreatment devices 18, 24, 26 may be connected in series with respect to a path of exhaust produced by engine 12.

First aftertreatment device 18 of aftertreatment system 14 may include a particulate filter and may be connected to engine 12 via first exhaust passage 16. However, first aftertreatment device 18 may include a diesel oxidation catalyst instead of, or in addition to, a particulate filter. A second exhaust passage 20 may be provided downstream of first aftertreatment device 18 and may extend to one or more additional aftertreatment devices, such as second aftertreatment device 24 and third aftertreatment device 26. Second aftertreatment device 24 may include an SCR catalyst. Third aftertreatment device 26 may include an oxidation catalyst such as an ammonia oxidation catalyst, or another suitable aftertreatment device. According to some aspects of the disclosure, the third aftertreatment device 26 may also include an SCR catalyst and an SCR inlet temperature sensor 175. Third aftertreatment device 26 may be provided in a common housing with second aftertreatment device 24, as shown in FIG. 1, or may be provided in a separate housing.

Reductant storage system 30 may form a containment, filtering, and heating device for reductant that includes a storage container 120, a header 100, and a filter assembly 40. Storage container 120 may be any suitable containment device that forms a reservoir for reductant. As used herein, the reductant (also known as a diesel exhaust fluid (DEF)) may include urea or any other appropriate fluid. Filter assembly 40 may extend within storage container 120 and may provide a seal at an upper opening of storage container 120, as described below. Storage system 30 may be connected to second exhaust passage 20 via a reductant injector 22 (e.g., DEF injector) and a reductant (DEF) supply passage 32. Reductant injector 22 may be provided at a distal end of reductant supply passage 32 and secured to second exhaust passage 20. One or more reductant pumps (not shown) may be provided in header 100 or reductant supply passage 32 to pump reductant from storage system 30 to reductant injector 22. The header 100 may be removably fixed to the storage container 120 and may include one or more components extending within the storage system 30. For example, header 100 may include components to monitor, heat, pump, and outlet reductant (e.g., DEF).

The internal combustion engine system 10 may further have sensors for detecting one or more parameters of the internal combustion engine system 10. For example, the internal combustion engine system 10 may have mass flow sensors 170, a NOx sensor 180, an SCR inlet temperature sensor 175, a fill sensor 160, and/or a tailpipe NOx sensor 185. The mass flow sensors 170 may be located within engine 12, and may measure parameters associated with calculating a mass flow including, for example, engine speed, density, fuel, and so forth. The NOx sensor may be a sensor that measures nitrogen oxide (NOx) levels in the exhaust of engine 12, and may be located at an exhaust of the engine 12 prior to the exhaust being treated by the first aftertreatment device 18. NOx may include nitric oxides, nitrogen dioxide, and other gasses that may be emitted in the exhaust of engine 12. Similarly, a tailpipe NOx sensor 185 may measure NOx levels in the tailpipe or exhaust outlet of the internal combustion engine system 10, e.g., after the exhaust of engine 12 has been treated by the aftertreatment system 14. The SCR inlet temperature sensor 175 may, as shown in FIG. 1, be part of the third aftertreatment device 26 to measure the temperature of the exhaust received from engine 12 after treatment by the first aftertreatment device 18 and/or second aftertreatment device 24 or other component of the aftertreatment system 14. While the SCR inlet temperature sensor 175 is shown in FIG. 1 at a location between the second aftertreatment device 24 and third aftertreatment device 26, the SCR inlet temperature sensor 175 may be placed at any suitable location, for example, before or after the first aftertreatment device 18. According to some aspects of the disclosure, more than one SCR inlet temperature sensor 175 may be implemented in the engine 12. A fill sensor 160 may further be used to calculate the amount of reductant (e.g. DEF) in the storage container 120. While the fill sensor 160 is shown in FIG. 1 as a single sensor, multiple float or fill sensors may be used to measure fill levels to provide data as provided further below with respect to FIGS. 2-3.

The internal combustion engine system 10 may further have a controller 150 configured to receive data from one or more sensors associated with the internal combustion engine system 10 as well as transmit data to one or more devices associated with the internal combustion engine system 10. The controller 150 may include at least one memory device storing instructions to perform various control functions and processes; at least one processor executing the instructions from memory device to perform a set of desired operations; and a communication interface facilitating the communication between various system components. The instructions may be non-transitory computer-readable instructions for executing a control application. A communication interface of the controller 150 may enable the controller 150 to communicate with the display 155 and a network interface (not shown). Accordingly, controller 150 may be configured to generate and return a GUI on display 155 according to, for example, the processes associated with FIGS. 2-3. Controller 150 may also include a wide variety of components or subsystems such as, processors, cache memory, memory controller, graphics controllers, network adapters, data processing devices, etc. In addition to performing logic, mathematical and other operations on data, the controller 150 may be configured to communicate or transfer data to and from the display 155, the network interface, sensors associated with the internal combustion engine system 12, and so forth. Although embodiments herein may be discussed as being performed by controller 150, various steps may be performed partially or entirely by other components, controllers, processors, devices, servers etc.

The controller 150 may, through a network interface, may be communicably connected to one or more machines directly, or via a network 125, such as 3G/4G/5G wireless networks, a local area network (LAN), a wide area network (WAN), a private data network, a virtual private network (VPN), and/or a public data network, such as the Internet. The network interface of the controller 150 may include any appropriate type of network device capable of communicating with other computer systems based on one or more wired or wireless communication protocols. The network interface of the controller 150 may be configured to send data to and receive data from the internal combustion engine system 12 or from other systems or sensors.

The controller 150 may receive data from one or more of mass flow sensors 170, NOx sensor 180, SCR inlet temperature sensor 175, fill sensor 160, ON/OFF switch 165, and/or tailpipe NOx sensor 185. As explained in further detail below with respect to FIGS. 2-3, the controller 150 may use this data to enable a DEF quality check process and/or estimate the quality of DEF for the internal combustion engine system 10 using a virtual sensor. The controller 150 may further be configured to transmit commands or messages to one or more devices associated with the internal combustion engine system 10 as explained further below with respect to FIGS. 2-3. For example, the controller 150, upon determining a fail condition, pass condition, or defer decision condition as explained further below, may transmit an indication to the display 155. As another example, the controller 150 may send instructions to the header 100 to increase or decrease an amount (e.g. dose) of DEF or reductant to add to the exhaust of the engine 12.

The controller 150 may further be connected with a display 155 of the internal combustion engine system 10, including an ON/OFF switch 165 (e.g. a key on-off switch) used to turn the engine 12 on and off. The display 155 may include any device capable of visual or tactile presentation of data and images in a form intelligible to a user. In some embodiments, the display 155 may present information dynamically in a visual medium. In some other embodiments, the display 155 may support a tactile display (display that may be felt by the fingers—and intended for the visually impaired) of data and images. In some embodiments, the display 155 supporting a tactile display may further be audio-enabled, such that parameter elements are associated with one or more sounds (e.g. musical tones, filtered noises, recorded sound effects, synthesized speech, and the like), in order to further assist a visually impaired user utilizing the display. Non-limiting examples of the display 155 may include a cathode ray tube, a liquid crystal display, a light emitting display, a plasma display, etc. In some embodiments, the display 155 may also accept input. In these embodiments, the display 155 may include a touch screen where information may be entered by selecting one of multiple options presented on the display. Selecting an option may be accomplished using a mouse (as is well known in the art), or touching an area of the display. In some embodiments, display 155 may comprise two or more displays in communication with controller 150.

Figure 2:
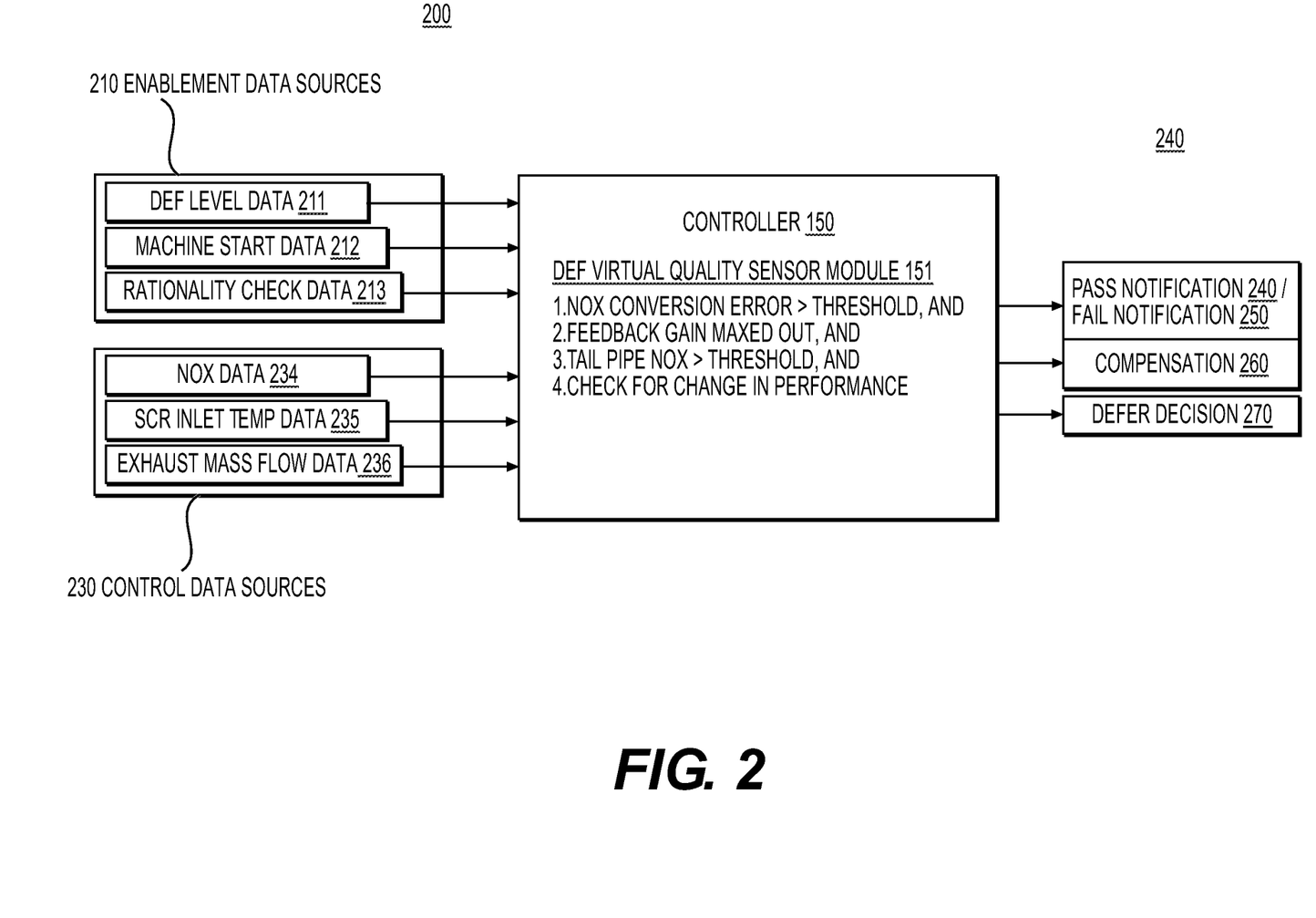
FIG. 2 is a block diagram illustrating a virtual sensor for estimating quality of reductant in an engine aftertreatment system, according to one or more aspects of the present disclosure.

FIG. 2 depicts a block diagram 200 illustrating a virtual sensor for estimating quality of reductant in an engine aftertreatment system, according to one or more aspects of the present disclosure. The block diagram 200 includes enablement data sources 210, control data sources 230, controller 150, a DEF virtual quality sensor module 151, a pass notification 240, a fail notification 250, a compensation command 260, and a defer decision 270. Enablement data sources 210 may be sources monitored by the controller 150 in order to determine whether or not to initiate a DEF quality check of the internal combustion engine system 10. For example, DEF level data 211 may be obtained from fill sensor 160 described above with respect to FIG. 1. As explained further below with respect to FIG. 3, the controller may initiate the DEF virtual quality sensor module 151 upon determining that there is a change in level of DEF (e.g., a DEF refill) in the storage container 120 based on the DEF level data 211. If no DEF refill is detected, then the controller 150 may refrain from initiating the DEF virtual quality sensor module 151. The controller 150 may also receive machine start data 212 from ON/OFF switch 165. For example, in some embodiments, upon determining that an engine ON condition exists based on the machine start data 212, the controller 150 may initiate the DEF virtual quality sensor module 151 and begin making determinations as described further below with respect to FIG. 3. The controller 150 may further receive rationality check data 213 from another device. For example the rationality check data 213 may be obtained from a process or system that determines whether or not one or more sensors, for example fill sensor 160, has failed or been tampered with. Upon receiving rationality check data 213 indicating that fill sensor 160 has failed or been tampered with, the controller 150 may determine an enabled condition and initiate the DEF virtual quality sensor module 151. The DEF virtual quality sensor module 151 may then perform a process as described further below with respect to FIG. 3 for estimating the quality of DEF in the internal combustion engine system 10. In this manner, DEF quality (and thus the aftertreatment system 14 performance) may be measured and quantified without the need for a separate physical sensor dedicated to measuring DEF in the exhaust.

The block diagram 200 further illustrates control data sources 230. Control data sources 230 may be used by the controller 150 to estimate the DEF quality in the internal combustion engine system 10. For example, NOx data 234 may be obtained from one or more NOx sensors associated with the internal combustion engine system 10, for example, NOx sensor 180 and tailpipe NOx sensor 185. The controller may further receive SCR inlet temperature data 235 and exhaust mass flow data 236 from the SCR inlet temperature sensor 175 and the mass flow sensors 170, respectively. The controller 150 may then use DEF virtual quality sensor module 151, based on data obtained from the control data sources 230, to generate one or more of a pass notification 240, a fail notification 250, a defer decision 270, or transmit compensation commands 260 described further below with respect to FIG. 3.

Figure 3:
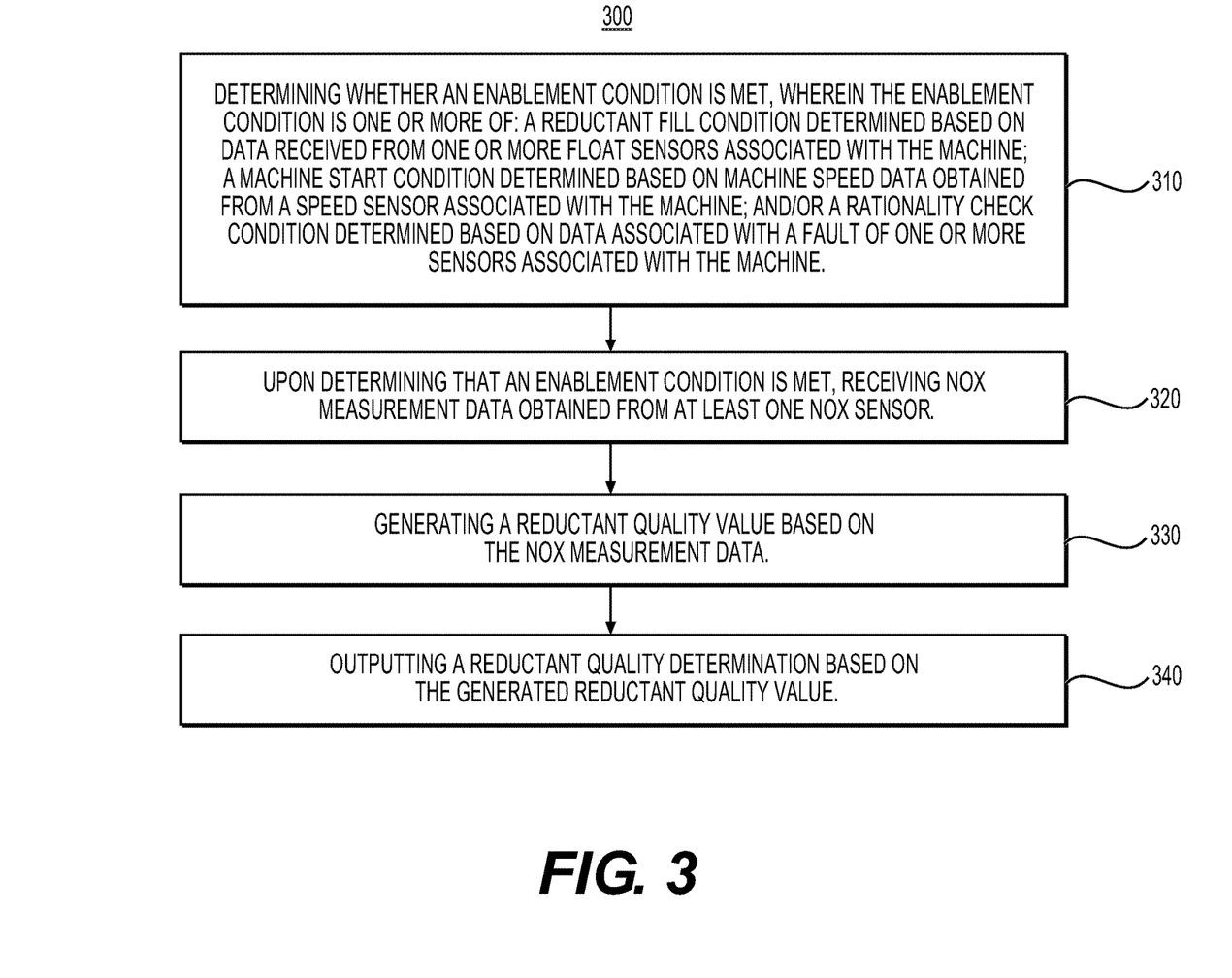
FIG. 3 is a flowchart of an exemplary method of using a virtual sensor for estimating quality of reductant in an aftertreatment system, according to one or more aspects of the present disclosure.

FIG. 3 illustrates an exemplary process 300 for estimating the quality of reductant in an engine aftertreatment system, e.g., by utilizing a virtual sensor according to one or more aspects discussed above. At step 310, the controller 150 determines whether an enablement condition is met in order to start the process of measuring or estimating DEF quality of the internal combustion engine system 10. In some aspects of the disclosure, an enablement condition is required before starting the process of estimating DEF quality. The enablement condition according to some aspects may be a reductant fill condition based on data received from one or more float sensors (e.g. fill sensor 160) associated with the internal combustion engine system 10. For example, the data received from the fill sensor may indicate that a reductant level in the aftertreatment system 14 has changed, and that change exceeds a fill threshold (e.g., an amount of reductant in the tank has changed by a sufficient amount to enable the next step). Upon determining that a reductant fill condition has been met, the controller 150 may initiate the process of measuring or estimating DEF quality. According to another aspect of the disclosure, the enablement condition may be a machine start condition. For example, this could be a determination that the engine has been turned or keyed on by a user. As another example, this could be determined based on an engine or machine speed data obtained from a speed sensor associated with the internal combustion engine system 10. In this example, once the speed of the engine reaches a speed threshold, the controller 150 may determine that the engine is ON and proceed to initiate the process of measuring or estimating DEF quality. According to yet another aspect, an enablement condition may be a rationality check condition. The rationality check condition may be determined based on data associated with a fault of one or more sensors associated with the internal combustion engine system 10. For example, data may indicate that a fill sensor 160 has been tampered with or has failed. Upon receiving data associated with a fault of the fill sensor 160, the controller 150 may initiate the process of measuring or estimating DEF quality. Preferably, only one of the conditions mentioned above need be met to initiate the process of measuring or estimating DEF quality. According to some aspects of the disclosure, some or all of the above mentioned conditions may be required before the controller 150 initiates the process of measuring or estimating DEF quality. At step 320, upon determining that an enablement condition is met, the controller 150 may receive NOx measurement data from at least one NOx sensor. As explained above, an NOx sensor is a sensor that measures impurities typically output in the exhaust of an engine, for example, internal combustion engine system 10. In some embodiments, the controller 150 may receive a plurality of NOx sensors, for example, NOx sensor 180 and tailpipe NOx sensor 185. According to some aspects, a first NOx sensor may be positioned to measure NOx levels in the exhaust of engine 12 before reductant is added, and a second NOx sensor may be located at a tailpipe of the engine to measure NOx levels in the exhaust of engine 12 after reductant is added by an aftertreatment system. The first NOx sensor, according to some aspects, may be NOx sensor 180 may, which measures NOx levels in the exhaust of engine 12 before the exhaust is treated (e.g. reductant is added) by aftertreatment system 14. The second NOx sensor may be tailpipe NOx sensor 185, which may be positioned to measure the NOx levels in the exhaust after the exhaust of engine 12 has been treated by aftertreatment system 14 and before the exhaust is output into the environment. While NOx sensors are described herein, other sensors for measuring other types of matter in an exhaust are within the scope of this disclosure.

Further at step 320, controller 150, after determining that an enablement condition is met, may also according to some aspects receive additional data. For example, controller 150 may receive SCR inlet temperature data from a SCR inlet temperature sensor, for example, SCR inlet temperature sensor 175. The SCR inlet temperature data may comprise data indicating measured temperatures of the exhaust output from engine 12 prior to the exhaust entering the aftertreatment system 14 for treatment. As another example, controller 150 may receive mass flow data (e.g., exhaust mass flow data) from a plurality of mass flow sensors, such as mass flow sensors 170 described above with respect to FIG. 1. Mass flow sensors 170 may include sensors that are helpful for detecting values used to calculate exhaust mass flow, for example, engine speed sensors, intake manifold temperature sensors, fuel sensors, and so forth.

At step 330, the controller 150 may generate a reductant quality value based on the NOx measurement data obtained at step 320. According to some aspects, the reductant quality value may be generated based on the NOx measurement data, SCR inlet temperature data, and/or the mass flow data obtained at step 320. In some aspects, the reductant quality value may be generated based on, for example, an average NOx conversion error. For example, an expected or desired NOx level or value may be determined based on the NOx present in the exhaust of engine 12 before treatment (e.g., before an amount of reductant is added to the exhaust by aftertreatment system 14). This expected NOx level may then be compared to the NOx level in the exhaust at the tailpipe of the internal combustion engine system 10, e.g., after reductant has been added to the exhaust by aftertreatment system 14. According to some aspects, the reductant quality value may be calculated as the difference between the expected NOx level and the actual NOx level measured at the tailpipe may be calculated. A predetermined threshold for the reductant quality value may then be set, such the controller 150 determines whether the reductant quality value exceeds the predetermined threshold. According to another aspect, generating the reductant quality value further includes determining whether a feedback gain value has reached a threshold gain value. A gain value may be, for example, a control parameter used to determine whether it is possible to correct issues. For example, the controller 150 may direct a header 100 to increase a dose or add additional reductant based on feedback in order to correct or modify the reductant quality value (e.g. difference between expected and actual NOx levels). The controller 150 will accordingly, determine whether the feedback gain value has reached a predetermined gain threshold (for example, determining that additional reductant or dosing would not meaningfully change the reductant quality value). According to an additional aspect, generating the reductant quality value may also include determining whether a tailpipe NOx value exceeds a pre-determined tailpipe threshold. For example, environmental or safety regulations or laws may exist that require NOx levels at a tailpipe of an engine to not exceed a certain NOx level. In these circumstances, the controller 150 will determine whether the tailpipe NOx value exceeds that pre-determined tailpipe threshold. According to another aspect, the controller 150 may check for a change in performance of the aftertreatment system. For example, the controller 150 may compare the reductant quality value and the feedback gain value and determine after the comparison whether a difference between these values exceeds another threshold value. As another example, the SCR inlet temperature data and mass flow sensor data may be used to calculate a conversion ratio error which may be used detect a change in performance. According to some aspects of the disclosure, the change in performance may be determined by comparing a current conversion ratio error with a default and/or a previously calculated conversion ratio error, for example, a conversion ratio error previously calculated after a pass notification 240 as explained above with respect to FIG. 2. The default and/or previously calculated conversion ratio error may be saved in a memory device for the comparison, such as in a non-volatile memory device. According to some aspects, the controller may determine whether all of the above conditions or thresholds have been met in a single system.

At step 340, the controller 150 may output a reductant quality determination based on the reductant quality value generated at step 330. The reductant quality determination, according to some aspects of the disclosure, may include data indicating a pass condition, a fail condition, or an indication of a defer decision condition. For example, according to aspects of the disclosure, the reductant quality determination may include a fail condition or indication upon determining that all of the following are met as described above with respect to step 330: the reductant quality value exceeds the pre-determined quality threshold; the feedback gain value has reached a threshold gain value; the tailpipe NOx value exceeds a pre-determined tailpipe threshold; and upon determining a change in performance, for example, a change in performance as described above with respect to step 330, for example, a comparison of the reductant quality value and the feedback gain value indicates a difference that exceeds another threshold value. As another example, according to aspects of the disclosure, the reductant quality determination may include a fail condition or indication upon determining that only one or more of the above are met as described above with respect to step 330. Further, according to some aspects, when the reductant quality determination includes the indication of the fail condition, the controller 150 may automatically transmit instructions to a display to turn the engine 12 off, or in other aspects automatically send instructions to turn the engine 12 off.

Upon determining that one or more thresholds described above is not met, the controller 150 may instead output a reductant quality determination that includes an indication of a pass condition. For example, controller 150 may determine a pass condition if it is determined that one or more, or all of, the following occur: the reductant quality value does not exceed the pre-determined quality threshold; the feedback gain value has not reached a threshold gain value; the tailpipe NOx value does not exceed a pre-determined tailpipe threshold; and/or comparison of the reductant quality value and the feedback gain value indicates a difference that does not exceed another threshold value. Upon outputting a reductant quality determination that includes an indication of a pass condition, the controller 150 may further determine whether the reductant quality value falls outside of a threshold range of values. This might be, for example, a desired range of NOx reduction in the exhaust of engine 12 even in the pass condition state. Upon determining that the reductant quality value falls below a pre-determined threshold, the controller may automatically transmit compensation instructions (e.g. instructions to increase/decrease/modify a dose or amount of reductant or DEF) to the engine aftertreatment system 14 via header 100. Accordingly, even in a pass condition, the controller 150 may still help optimize the amount of DEF supplied by the aftertreatment system 14.

According to some aspects, the reductant quality determination may include an indication of a defer decision condition. The defer decision condition may occur when, for example, the engine has not reached an optimal or predetermined temperature or speed for measuring DEF quality. For example, controller 150 may receive data from one or more sensors associated with engine 12 indicating an engine speed, engine temperature, or exhaust temperature. An engine temperature may be, for example, a temperature obtained from a sensor measuring one or more temperature parameters of engine 12, for example, an engine coolant temperature, an engine intake manifold temperature, and so forth. If enablement conditions as described above at step 310 are met, but the engine speed, engine temperature, or exhaust temperature fall below predetermined values, the controller 150 may, for example refrain from taking further actions. For example, the controller 150 may refrain from transmitting compensation instructions to the aftertreatment system 14; or transmitting engine-off instructions to the engine 12. Once the engine speed, engine temperature and/or engine exhaust temperature reach a predetermined level, the controller 150 may proceed with outputting a reductant quality determination with a pass condition or a fail condition as described above. As explained above, an engine temperature may include, for example, coolant temperature, manifold temperature, and so forth. According to some aspects of the disclosure, a thermal management system may be utilized to increase engine exhaust temperature in order to reduce the duration of the defer decision condition. By using a thermal management system to assist engine 12 with reaching the optimal or predetermined temperature or speed for measuring DEF quality, the virtual sensor may be implemented more quickly after engine start. In this manner, a virtual sensor is thus implemented by controller 150 that is able to estimate the quality of DEF in an internal combustion engine system 10 without the need of a separate dedicated sensor for measuring or estimating DEF quality.

In general, any process or operation discussed in this disclosure that is understood to be computer-implementable, such as the processes illustrated in FIG. 3, may be performed by one or more processors of a computer system, such any of the systems or devices associated with internal combustion engine system 10 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices associated with internal combustion engine system 10 of FIG. 1, for example, a computing system associated with controller 150 and/or display 155. One or more processors of a computer system may be included in a single computing device or distributed among a plurality of computing devices. A memory of the computer system may include the respective memory of each computing device of the plurality of computing devices.

Figure 4:
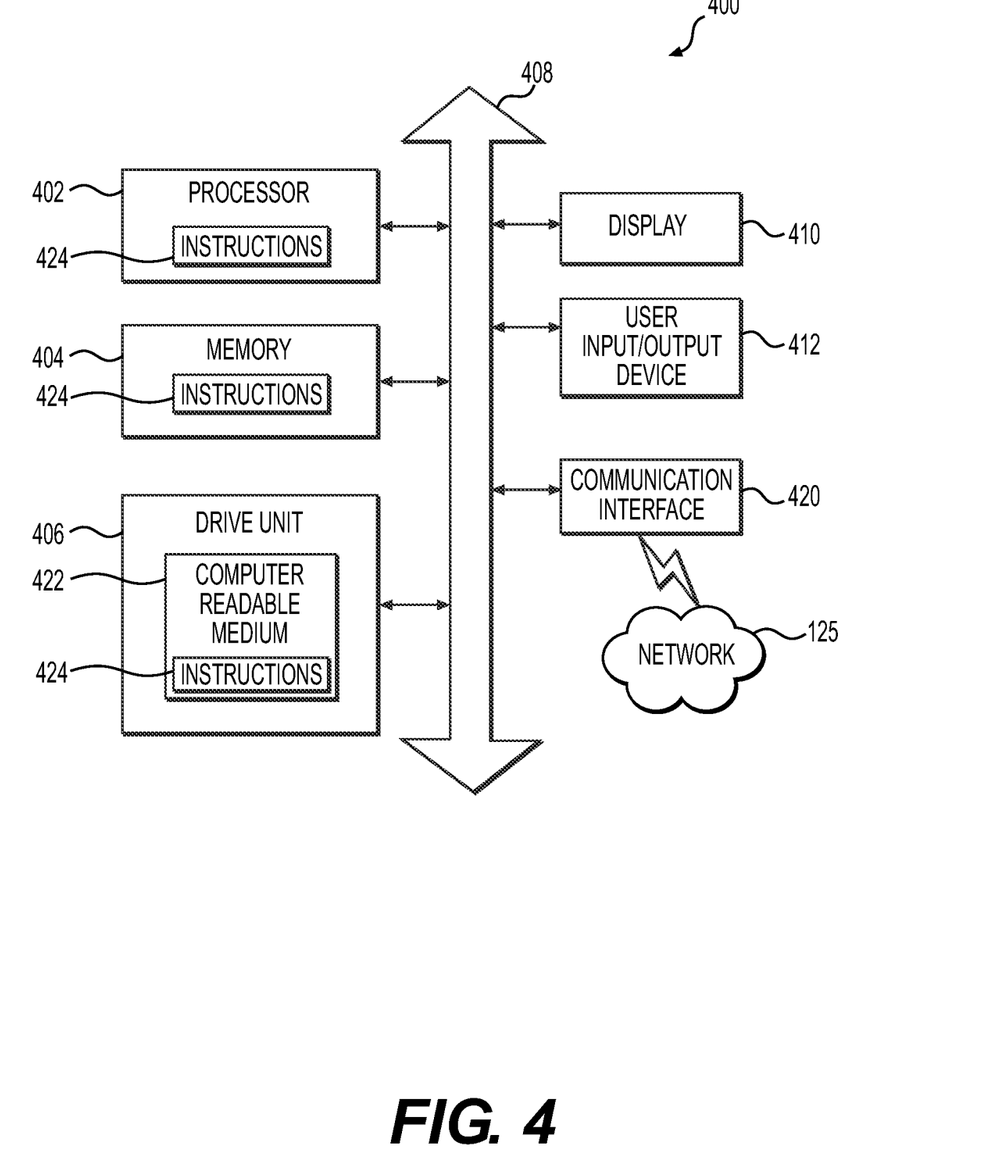
FIG. 4 is an example of a computing device, according to one or more aspects of the present disclosure.

FIG. 4 is a simplified functional block diagram of a computer 400 that may be configured as a device for executing the method of FIG. 3, according to exemplary embodiments of the present disclosure. For example, the computer 400 may be configured as the controller 150 and/or another system according to exemplary embodiments of this disclosure. In various embodiments, any of the systems herein may be a computer 400 including, for example, a data communication interface 420 for packet data communication. The computer 400 also may include a central processing unit ("CPU") 402, in the form of one or more processors, for executing program instructions. The computer 400 may include an internal communication bus 408, and a storage unit 406 (such as ROM, HDD, SDD, etc.) that may store data on a computer readable medium 422, although the computer 400 may receive programming and data via network communications, for example, via network 125. The computer 400 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

INDUSTRIAL APPLICABILITY

The disclosed aspects of the virtual sensor and the controller 150 may be employed in a variety of machines and/or vehicles. For example, controller 150 may be included in any mobile or stationary vehicle or machine having an aftertreatment system with a fluid storage and supply system, such as a reductant storage and supply system. Controller 150 may be configured to reduce NOx emissions of any internal combustion engine by monitoring quality and supplying a reductant such as DEF.

During the operation of internal combustion engine system 10, engine 12 combusts fuel (e.g., diesel) and generates NOx-containing exhaust. Exhaust may exit engine 12 for treatment by aftertreatment system 14, in which aftertreatment devices 18, 24, 26 may reduce one or more undesired components from the exhaust. First exhaust passage 16 may provide a path for exhaust to flow from engine 12 to first aftertreatment device 18. The exhaust and reductant may travel from second exhaust passage 20 to aftertreatment devices 24 and 26, at least one of which may include an SCR catalyst that reduces NOx via a reaction involving the catalyst and reductant. Exhaust may exit aftertreatment system 14 via third exhaust passage 28.

By utilizing data obtained from one or more of NOx sensor 180, tailpipe NOx sensor 185, fill sensor 160, SCR inlet temperature sensor 175, and mass flow sensors 170, a virtual sensor may be implemented by controller 150 that accurately and efficiently determines reductant (e.g. DEF) quality without the need for a separate physical sensor. Further, this process may be enabled through a simple set of conditions, e.g. machine start data, DEF level data, and or a rationality check process. By providing a virtual sensor, drawbacks associated with physical sensors are avoided. A virtual sensor is not prone to failures due to aging, permeation, aeration, damage, ambient conditions inaccuracies (such as icing), and so forth as with physical sensors. Further, the need to manufacture and install a physical DEF quality sensor is avoided.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for estimating a quality of reductant in an engine aftertreatment system for an engine using a virtual sensor, the method comprising:
   determining, by one or more processors, whether an enablement condition is met, wherein the enablement condition is one or more of:
      a reductant fill condition determined based on data received from one or more float sensors associated with the engine;
      a machine start condition determined based on machine speed data obtained from a speed sensor associated with the engine; and/or
      a rationality check condition determined based on data associated with a fault of one or more sensors associated with the engine;
   upon determining that the enablement condition is met, receiving, at one or more processors, NOx measurement data obtained from at least one NOx sensor;
   generating, by the one or more processors, a reductant quality value based on the NOx measurement data during operation of the engine by initiating the virtual sensor, while supplying reductant, in response to the determination that the enablement condition is met; and
   outputting, by the one or more processors, a reductant quality determination based on the reductant quality value.

2. The method of claim 1, wherein the NOx measurement data is obtained from at least two NOx sensors.

3. The method of claim 2, wherein:
   a first NOx sensor of the at least two NOx sensors measures NOx levels in exhaust of the engine before a reductant is added by the engine aftertreatment system; and
   a second NOx sensor of the at least two NOx sensors is located at a tailpipe of the engine and measures NOx levels in exhaust of the engine after a reductant is added.

4. The method of claim 1, further comprising:
   receiving, by the one or more processors, SCR inlet temperature data from a SCR inlet temperature sensor, wherein the reductant quality value is further generated based on the NOx measurement data and the SCR inlet temperature data.

5. The method of claim 4, further comprising:
   receiving, by the one or more processors, mass flow data from a plurality of mass flow sensors, wherein the reductant quality value is further generated based on the NOx measurement data, the SCR inlet temperature data, and the mass flow data.

6. The method of claim 5, wherein generating the reductant quality value comprises one or more of:
   determining whether the reductant quality value exceeds a pre-determined quality threshold;
   determining whether a feedback gain value has reached a threshold gain value; or
   determining whether a tailpipe NOx value exceeds a pre-determined tailpipe threshold.

7. The method of claim 6, further comprising:
   transmitting, by the one or more processors, an indication of a fail condition upon determining that:
      the reductant quality value exceeds the pre-determined quality threshold;
      the feedback gain value has reached the threshold gain value;
      the tailpipe NOx value exceeds the pre-determined tailpipe threshold; and/or
      there is a change in performance of the aftertreatment system.

8. The method of claim 1, wherein the reductant quality determination includes an indication of a pass condition, an indication of a fail condition, or an indication of a defer decision condition.

9. The method of claim 8, further comprising:
   when the reductant quality determination includes the indication of the pass condition:
      determining, by the one or more processors, if the reductant quality value falls below a pre-determined threshold;
      upon determining, by the one or more processors, that the reductant quality value falls below a pre-determined threshold, automatically transmitting compensation instructions to the engine aftertreatment system; and
   when the reductant quality determination includes the indication of the fail condition, automatically transmitting engine-off instructions to the engine; and
   when the reductant quality determination includes the indication of the defer decision condition:
      refraining from:
         transmitting compensation instructions to the engine aftertreatment system;
         or
         transmitting engine-off instructions to the engine; and
      sending instructions to a thermal management system to increase an engine speed or an engine temperature.

10. A system for estimating a quality of reductant in an engine aftertreatment system for an engine using a virtual sensor, the system comprising:
    a memory storing instructions; and
    a processor executing the instructions to perform a process including:
       determining whether an enablement condition is met, wherein the enablement condition is one or more of:
          a reductant fill condition determined based on data received from one or more float sensors associated with the engine;
          a machine start condition determined based on machine speed data obtained from a speed sensor associated with the engine; and/or
          a rationality check condition determined based on data associated with a fault of one or more sensors associated with the engine;
       upon determining that the enablement condition is met, receiving NOx measurement data obtained from at least two NOx sensors;
       generating a reductant quality value based on the NOx measurement data;
       determining a reductant quality based on the reductant quality value, the reductant quality determination resulting in a pass condition, a fail condition, or a defer decision condition;
       outputting the determined reductant quality, including an indication of the pass condition, an indication of the fail condition, or an indication of the defer condition; and
       in response to determining the defer decision condition:
          refraining from:
             transmitting compensation instructions to the engine aftertreatment system; or
             transmitting engine-off instructions to the engine.

11. The system of claim 10, wherein:
a first NOx sensor of the at least two NOx sensors measure NOx levels in exhaust of the engine before reductant is added; and
a second NOx sensor of the at least two NOx sensors is located at a tailpipe of the engine and measures NOx levels in the machine exhaust after reductant is added.

12. The system of claim 10, the process further comprising:
receiving SCR inlet temperature data from a SCR inlet temperature sensor; and
receiving mass flow data from a plurality of mass flow sensors,
wherein the reductant quality value is further generated based on the NOx measurement data, the SCR inlet temperature data, and the mass flow data.

13. The system of claim 12, wherein generating the reductant quality value comprises one or more of:
determining whether the reductant quality value exceeds a pre-determined quality threshold;
determining whether a feedback gain value has reached a threshold gain value; or
determining whether a tailpipe NOx value exceeds a pre-determined tailpipe threshold.

14. The system of claim 10, the process further comprising:
in response to determining the pass condition:
determining if the reductant quality value falls below a pre-determined threshold; and
upon determining that the reductant quality value falls below a pre-determined threshold, automatically transmitting compensation instructions to the engine aftertreatment system; and
in response to determining the fail condition, automatically transmitting engine-off instructions to the engine.

15. A non-transitory computer-readable medium storing instructions that, when executed by a processor, cause the processor to perform a method for estimating a quality of reductant in an engine aftertreatment system for an engine using a virtual sensor, the method comprising:
determining whether an enablement condition is met, wherein the enablement condition is one or more of:
a reductant fill condition determined based on data received from one or more float sensors associated with the engine;
a machine start condition determined based on machine speed data obtained from a speed sensor associated with the engine; and/or
a rationality check condition determined based on data associated with a fault of one or more sensors associated with the engine;
upon determining that the enablement condition is met, receiving NOx measurement data obtained from at least two NOx sensors;
generating a reductant quality value based on the NOx measurement data; and
outputting a reductant quality determination based on the generated reductant quality value, including an indication of a fail condition upon determining that:
the reductant quality value exceeds a pre-determined quality threshold;
a feedback gain value has reached a threshold gain value;
a tailpipe NOx value exceeds a pre-determined tailpipe threshold; and/or
there is a change in performance of the aftertreatment system.

16. The non-transitory computer-readable medium of claim 15, wherein:
a first NOx sensor of the at least two NOx sensors measures NOx levels in exhaust of the engine before a reductant is added by the engine aftertreatment system; and
a second NOx sensor of the at least two NOx sensors is located at a tailpipe of the engine and measures NOx levels in exhaust of the engine after a reductant is added.

17. The non-transitory computer-readable medium of claim 15, the method further comprising:
receiving SCR inlet temperature data from a SCR inlet temperature sensor; and
receiving mass flow data from a plurality of mass flow sensors,
wherein the reductant quality value is further generated based on the NOx measurement data, the SCR inlet temperature data, and the mass flow data.

18. The non-transitory computer-readable medium of claim 15, wherein the reductant quality determination includes an indication of a pass condition or an indication of a defer decision condition, when the reductant quality determination results in an indication other than the fail condition.

19. The non-transitory computer-readable medium of claim 18, the method further comprising:
when the reductant quality determination includes the indication of the pass condition:
determining if the reductant quality value falls below a pre-determined threshold; and
upon determining that the reductant quality value falls below a pre-determined threshold, automatically transmitting compensation instructions to the engine aftertreatment system;
when the reductant quality determination includes the indication of the fail condition, automatically transmitting engine-off instructions to the engine; and
when the reductant quality determination includes the indication of the defer decision condition, refraining from:
transmitting compensation instructions to the engine aftertreatment system; or
transmitting engine-off instructions to the engine.

20. The non-transitory computer-readable medium of claim 15, the method further comprising:
when the reductant quality determination includes the indication of the fail condition, automatically transmitting engine-off instructions to the engine.

* * * * *